July 2, 1963  G. H. CLARIDGE ETAL  3,096,068
BALL-COCK

Filed June 24, 1960  2 Sheets-Sheet 1

Inventor
GEORGE H. CLARIDGE
CLARENCE J. MAINDONALD
By *Philip H. Shenda*
Attorney July 2, 1963  G. H. CLARIDGE ETAL  3,096,068
BALL-COCK
Filed June 24, 1960  2 Sheets-Sheet 2

Inventor
GEORGE H. CLARIDGE
CLARENCE J. MAINDONALD
By Philip H. Sheridan
Attorney 3,096,068
BALL-COCK
George H. Claridge, 105 Easther Crescent, and Clarence
J. Maindonald, 97 Crawford St., both of Dunedin,
Otago, New Zealand
Filed June 24, 1960, Ser. No. 38,653
Claims priority, application New Zealand June 26, 1959
1 Claim. (Cl. 251—118)

The invention relates to ball-cocks, and has for its object the provision of a ball-cock of improved construction in which the pressure of liquid within the ball-cock when the ball-cock is in use is utilized in effecting the opening and closing of the ball-cock, so that only a comparatively slight external force is required in order to initiate the opening and closing actions of the ball-cock.

A further object of the invention is to provide a ball-cock in which the closing action of the ball-cock takes place suddenly following a relatively small initial movement of a valve member of the ball-cock, so that the flow of liquid through the ball-cock when it is in use is shut off suddenly and without the noise associated with the gradual closing action of several conventional kinds of ball-cocks.

Other objects and advantages of the invention will be apparent from the following description.

The ball-cock provided by the invention consists of a valve body having a valve chamber and having a liquid inlet and a liquid outlet communicating with the valve chamber; a valve member which is movable within the valve chamber between an open position in which liquid can pass from the inlet to the outlet of the valve body through the valve chamber, and a closed position in which the valve member closes the outlet of the valve body to the passage of liquid; and a flexible diaphragm which is fixed at its central portion to the valve member and is anchored at its peripheral portions to the valve body in such a manner that it forms a closure for an opening of the valve body opposite the outlet thereof; wherein the inlet communicates with the valve chamber between the diaphragm and the outlet, and the valve member has a portion which extends beyond the said diaphragm to the exterior of the valve body and is adapted to be engaged and moved by a pivoted float arm of the ball-cock so as to initiate each opening and closing movement of the valve member, whilst the relative effective areas of the diaphragm and of the portion of the valve member which closes the outlet are such that, in the closed position of the valve member, liquid under pressure within the valve chamber exerts a greater pressure on the said portion of the valve member in the direction of closing of the valve member than it exerts in the opposite direction on the diaphragm.

For preference, a restriction is provided in the outlet of the valve body, or in an outlet pipe leading therefrom, the dimensions of the restriction being such that, when the valve member is moved to its open position, the flow of liquid through the valve body and through the restriction creates a back pressure which is exerted upwardly against the portion of the valve member which closes the outlet, the back pressure so exerted, when added to the pressure exerted on the diaphragm, being sufficient to overcome the closing pressure exerted on the said portion of the valve member, and thus to hold the valve member in its open position until a downward movement of the valve member is initiated by movement of the float arm. The arrangement is such that a comparatively slight closing movement of the valve member is sufficient to reduce the flow of liquid through the outlet, and thus reduce the said back pressure, to a point at which the combined back pressure and pressure on the diaphragm is overcome by the closing pressure exerted on the said portion of the valve member, so that the valve member at that stage moves rapidly to its closed position.

The diaphragm is conveniently anchored to the valve body by means of a cap or plug of either unitary or composite form which is secured to the valve body at its said opening. The cap or plug may form the part to which the float arm is pivoted.

A ball-cock constituting one embodiment of the invention, and some possible constructional modifications of that ball-cock, will now be described in more detail by way of example of how the invention can be carried into effect and with reference to the accompanying drawings, in which.

Figure 1:
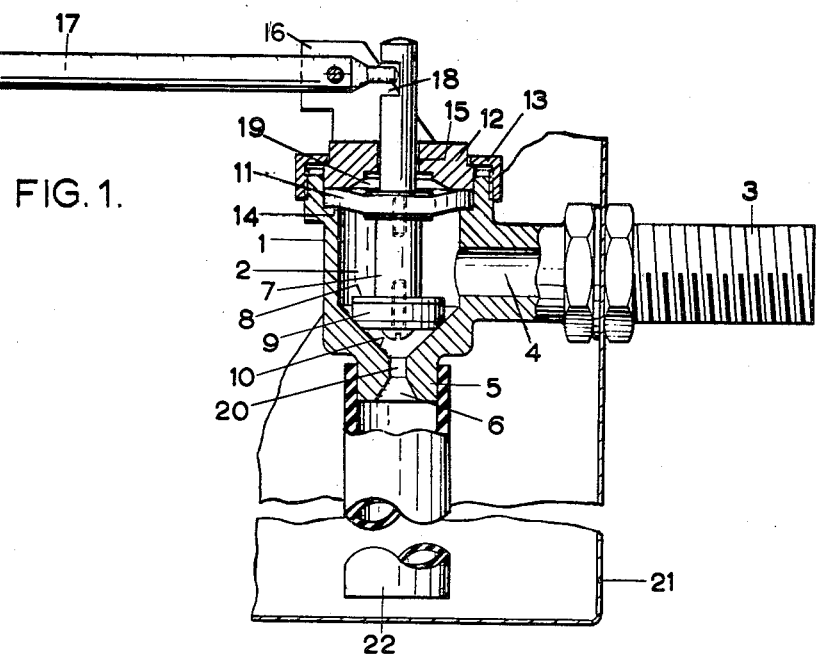
FIGURE 1 is an elevation of the ball-cock, principally in vertical section, showing the ball-cock fitted to a portion of a cistern, and showing the moving parts of the ball-cock in the position which they occupy when the ball-cock is closed and the cistern is full.

The ball-cock shown in the drawings has a valve body 1 in the form of a casting having a main portion which encloses a cylindrical valve chamber 2, an inlet connection 3 through which extends a liquid inlet 4 communicating with the central part of the valve chamber 2, and an outlet connection 5 through which extends a liquid outlet 6 communicating with one end of the valve chamber 2. At the other end of the valve chamber 2, the valve body 1 has an opening which is closed in a manner hereinafter described.

The ball-cock also includes a valve member 7 which is movable within and longitudinally of the valve chamber 2, the valve member 7 having at one end an annular flange 8 against which is secured a washer 9 arranged to bed on a valve seating 10 of the valve body 1, and thereby close the outlet 6 to the passage of liquid therethrough. In the ball-cock shown in FIGURES 1 to 3 of the drawings, also in the modification shown in FIGURE 4, the valve seating 10 is formed within the valve body 1 at the junction of the valve chamber 2 with the liquid outlet 6, and the washer 9 is faced around its lower circumferential edge portion so as to seat on the seating 10. In the modification shown in FIGURE 5, however, the valve seating 10 is formed as an upstanding annular rim or lip surrounding the junction of the valve chamber 2 and liquid outlet 6, the lower face of the washer 9 being left plane.

At its central portion, the valve member 7 is fitted with an annular diaphragm 11 which is fixed to the valve member 7 between separable screwed-together upper and lower portions thereof, and is anchored at its peripheral portion to the valve body 1 so as to form a closure for the said opening of the valve body 1. The arrangement is such that, when the valve member 7 is in its closed position (shown in FIGURE 1) in which the washer 9 closes the liquid outlet 6, the liquid inlet 4 communicates with the valve chamber 2 between the washer 9 and the diaphragm 11 so that pressure of liquid is exerted in a closing direction on the washer 9 and in an opening direction on the diaphragm 11. The area of the washer 9 which is exposed to such pressure is greater than the area of the diaphragm 11 which is responsive to such pressure so that the pressure so exerted serves to hold the valve member 7 in its closed position.

The anchoring of the diaphragm 11 to the valve body 1 is effected by means of a cap of composite form comprising a plug 12 which is fitted within the said opening of the valve body 1 and is held therein by a retaining piece 13 screwed on the valve body 1 so that the peripheral portion of the diaphragm 11 is compressed between the plug 12 and an internal shoulder 14 at the point of communication of the said opening with the adjacent end of the valve chamber 2.

The plug 12 is formed with a central opening, or bore, 15, through which slidably passes the upper end portion of the valve member 7. The plug 12 is also provided with a pair of lugs 16 which project from its upper face, the usual float arm (17) associated with a ball-cock being pivotally pinned between the lugs 16 of the plug 15 adjacent to one end of the float arm 17. The upper end portion of the valve member 7 projects beyond the plug 12 externally of the valve body 1 and is provided at its projecting portion with a slot 18 within which rests the adjacent end portion of the float arm 17. The dimensions and disposition of the slot 18 are such that the said end portion of the float arm 17 engages the valve member 7 to initiate both the opening and the closing movement of the latter, whilst considerable pivotal movement of the float arm 17 is possible following the opening of the valve member 7 without engagement of the float arm 17 with the valve member 7 so as to impart movement thereto.

The lower surface of the plug 12, adjacent to the diaphragm 11, is recessed at 19 to an extent which permits the necessary flexing of the diaphragm 11 between the open and closed positions of the valve member 7, whilst ensuring that the area of the diaphragm that is effectively movable under the upward pressure of liquid within the valve chamber 1 is less than the area of the washer 9 that is at the same time exposed to downward pressure of such liquid.

Figure 2:
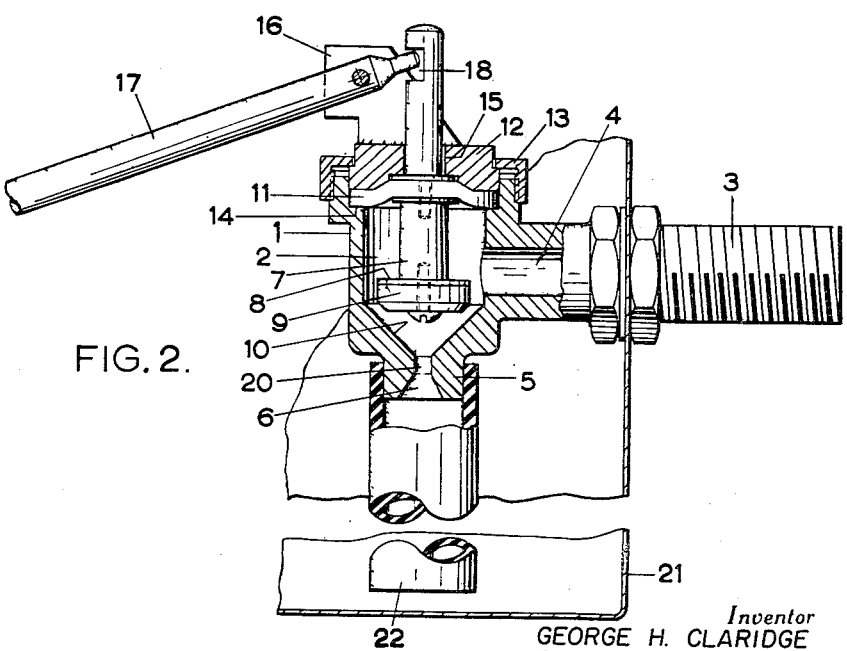
FIGURE 2 is an elevation similar to FIGURE 1, but showing the moving parts of the ball-cock in the position which they occupy when the ball-cock is open and the cistern is empty.
Figure 3:
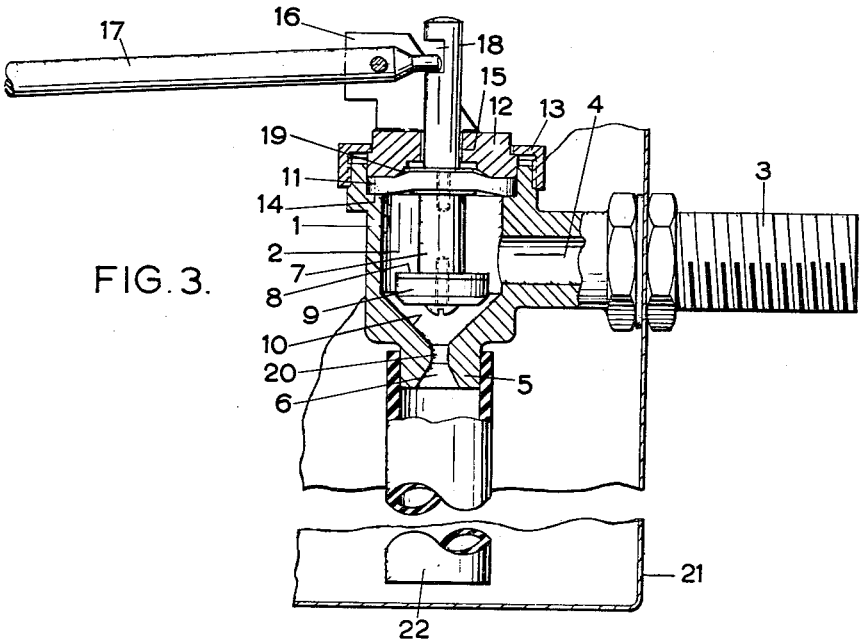
FIGURE 3 is an elevation similar to FIGURES 1 and 2, but showing the moving parts of the ball-cock in the position which they occupy when the cistern is nearly full and the ball-cock has commenced to close, just prior to the final closing movement of the valve member of the ball-cock.

In the ball-cock shown in FIGURES 1 to 3 of the drawings, the liquid outlet 6 is formed with an intermediate restricted throat 20, the diameter of which is less than that of the liquid inlet 4, so that the throat 20 gives rise to a back pressure of liquid on the washer 9 in the direction of opening of the valve member 7 when the valve member 7 is fully open and liquid is passing through the ball-cock. The diameter of the throat 20 is such that the back pressure so produced is sufficient, when added to the pressure in the same direction exerted on the diaphragm 11, to overcome the pressure in the opposite, or closing, direction exerted on the upper face of the washer 9, so that the valve member 7 is held in its open position shown in FIGURE 2 until its closing movement is initiated by the float arm 17, as shown in FIGURE 3. The disposition of the washer 9 in relation to its seating 10 is such that, once the closing movement of the valve member 7 has been so initiated, the outflow of liquid from the valve chamber 2 through the outlet 6 is reduced to a point at which the back pressure of liquid on the washer largely disappears. At that stage, the closing pressure exerted on the upper face of the washer 9 overcomes the opening pressure exerted on the diaphragm 11, with the result that the completion of the closing movement of the valve member 7 takes place virtually instantaneously thereafter to shut off the flow of liquid through the outlet 6.

When a cistern (21) fitted with the ball-cock shown in FIGURES 1 to 3 of the drawings is emptied of its liquid contents, the downward movement of the float arm 17 causes the pivoted end of the float arm to engage the upper end of the slot 18 in the valve member 7 when the float is near the bottom of the cistern, further downward movement of the float initiating the opening movement of the valve member 7, to the point at which the flow of liquid through the outlet 6 and throat 20 is sufficient to produce the back pressure required to keep the valve member 7 in its open position. In the open position of the valve member 7, the rising of the float and the consequent pivotal movement of the float arm 17 does not effect a transference of movement to the valve member 7 until the cistern is nearly full, at which stage the pivoted end of the float arm 17 engages the lower end of the slot 18 in the valve member 7. Further upward movement of the float initiates the closing movement of the valve member 7, and this takes place in the manner described above.

Figure 5:
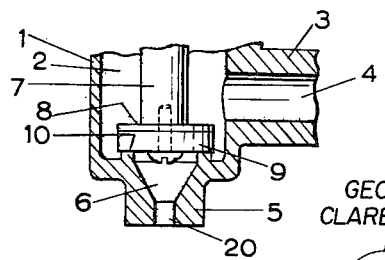
FIGURE 5 is an elevation of a part of the ball-cock, principally in vertical section, showing a constructional modification affecting the washer and valve seating of the ball-cock.

In the modified construction shown in FIGURE 5 of the drawings, the lower end of the outlet 6 is restricted in the same manner as the throat 20, and has the same effect as the throat 20 on the operation of the ball-cock and the movement of the valve member 7.

Figure 4:
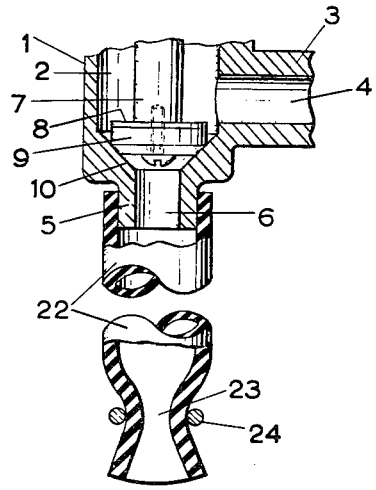
FIGURE 4 is an elevation of a portion of the ball-cock, principally in vertical section, showing a constructional modification affecting the outlet and outlet pipe of the ball-cock.

To reduce noise during the filling of the cistern 21, the liquid outlet 6 may be of a diameter which is nowhere less than that of the liquid inlet 4, the required back pressure on the washer 9 being provided by one or more restrictions in the usual outlet pipe (22) leading from the outlet connection 5 to the lower portion of the cistern 21. This constructional modification of the ball-cock is shown in FIGURE 4 of the drawings, wherein the outlet pipe 22 is of a flexible material, such as a flexible synthetic resin, and is shown provided with a restriction 23 at its lower end portion, the restriction 23 being effected by means of a clamp or rubber ring, indicated at 24. In addition to the restriction 23 at the lower end portion of the outlet pipe 22, one or more additional similar restrictions may be provided in the pipe 22 in its central and/or upper portions.

By means of the ball-cock described above, a more silent flow of liquid through the ball-cock is obtainable than is the case with conventional ball-cocks such as are at present generally used. The balancing of pressures on the washer 9 and diaphragm 11 of the valve member 7 minimises wear on the washer 9, while ensuring an adequate seal between the washer 9 and its seating 10 in the closed position of the valve member 7. The provision of the restriction in the liquid outlet 6 or in the outlet pipe 22 ensures a swift opening and closing movement of the valve member 7, and very considerably reduces the noise associated with the gradual opening and closing of the valve members of conventional ball-cocks.

We claim:

A ball-cock fluid valve device comprising: a circular valve body defining a valve chamber having an annular internal shoulder near its top opening, an integral pipe opening into one side defining a fluid inlet, a tapered bottom portion defining a valve seat, an outlet, and a throat of lesser diameter than said inlet connecting said outlet with said tapered bottom portion; a circular valve stem in said chamber having a circular flange on its lower end with a washer substantially covering its edge, said flange and washer being of a diameter substantially less than that of said chamber and constituting a valve member cooperating with said valve seat to form an outlet valve; a circular stem member extending out of said valve chamber having an elongated notch near its outer end; a circular diaphragm having a diameter greater than that of said chamber clamped at its central portion between the upper end of said valve stem and the lower end of said stem member; a circular cap provided with an external shoulder, a central bore for receiving said stem member and an internal recess in its bottom surface; said diaphragm being clamped by its peripheral edge between the lower edge of said cap and said internal shoulder and adapted to flex at its central portion with movement of said valve stem to vary the area of said chamber; said inlet being located between said valve member and said diaphragm when the valve is in the closed position; a circular retainer member seated on said external shoulder and securing said cap over the top of said chamber and clamping it on the periphery of said diaphragm; a pair of upstanding spaced-apart lugs on the top of said cap; a float arm adapted to carry a float at one end and pivotally mounted between said lugs at a point near its other end with said other end being of a reduced diameter which is less than the longitudinal dimension of said notch and fitting in said notch to effect movement of said stem member in response to movement of said float arm to effect opening and closing of said valve; said valve having a balanced condition at a certain position of said valve member, the combined effective area of said diaphragm and said valve member being such that the resultant force on them from internal fluid pressure will hold the valve member in the open position when it is open and in the closed position when it is closed.

References Cited in the file of this patent

UNITED STATES PATENTS

| | | |
|---|---|---|
| 449,351 | Keyworth | Mar. 31, 1891 |
| 571,023 | Scott | Nov. 10, 1896 |
| 649,635 | Ford | May 15, 1900 |
| 1,172,739 | Roehrich | Feb. 22, 1916 |
| 1,272,957 | Humphrey | July 16, 1918 |
| 1,302,538 | Gulick | May 6, 1919 |
| 2,602,627 | Britton | July 8, 1952 |
| 2,718,373 | Henry | Sept. 20, 1955 |

FOREIGN PATENTS

| | | |
|---|---|---|
| 147,450 | Switzerland | Aug. 17, 1931 |